US010007713B2

United States Patent
Farre Guiu et al.

(10) Patent No.: US 10,007,713 B2
(45) Date of Patent: Jun. 26, 2018

(54) METADATA EXTRACTION AND MANAGEMENT

(71) Applicant: Disney Enterprises, Inc., Burbank, CA (US)

(72) Inventors: Miguel Angel Farre Guiu, Bern (CH); Marc Junyent Martin, Barcelona (ES); Jordi Pont-Tuset, Barcelona (ES); Pablo Beltran, Barcelona (ES); Nimesh Narayan, Los Angeles, CA (US); Leonid Sigal, Pittsburgh, PA (US); Aljoscha Smolic, Aarau (CH); Anthony M. Accardo, Los Angeles, CA (US)

(73) Assignee: Disney Enterprises, Inc., Burbank, CA (US)

( * ) Notice: Subject to any disclaimer, the term of this patent is extended or adjusted under 35 U.S.C. 154(b) by 336 days.

(21) Appl. No.: 14/883,861

(22) Filed: Oct. 15, 2015

(65) Prior Publication Data
US 2017/0109419 A1    Apr. 20, 2017

(51) Int. Cl.
*G06F 17/00* (2006.01)
*G06F 17/30* (2006.01)
(Continued)

(52) U.S. Cl.
CPC ...... *G06F 17/30569* (2013.01); *G06F 3/0481* (2013.01); *G06F 3/0484* (2013.01);
(Continued)

(58) Field of Classification Search
CPC ......... G06F 17/30569; G06F 17/30371; G06F 17/30876; G06F 3/0481; G06F 3/0484; G06F 17/24
(Continued)

(56) References Cited

U.S. PATENT DOCUMENTS 6,760,721 B1 * 7/2004 Chasen ............ G06F 17/30038
8,150,929 B2 * 4/2012 Martin ................... G06Q 30/00
709/206

(Continued)

OTHER PUBLICATIONS

Tsinaraki, Chrisa, et al., "An Ontology-Driven Framework for the Management of Semantic Metadata describing Audiovisual Information", CAiSE 2003, Klagenfurt/Velden, Austria, Jun. 16-20, 2003, pp. 340-356.*

(Continued)

*Primary Examiner* — Robert Stevens
(74) *Attorney, Agent, or Firm* — Farjami & Farjami LLP

(57) ABSTRACT

There are provided systems and methods for performing metadata extraction and management. Such a system includes a computing platform having a hardware processor, a system memory, and metadata extraction and management unit stored in the system memory. The system is configured to extract multiple metadata types from a media asset, and to aggregate the multiple metadata types to produce an aggregated metadata describing the media asset. The system is further configured to transform the aggregated metadata into at least one database entry identifying the media asset, and to map the at least one database entry into a graphical database so as to relate the media asset to at least one other media asset represented in the graphical database.

12 Claims, 5 Drawing Sheets

(51) Int. Cl.
*G06F 3/0484* (2013.01)
*G06F 17/24* (2006.01)
*G06F 3/0481* (2013.01)

(52) U.S. Cl.
CPC ........ *G06F 17/24* (2013.01); *G06F 17/30371* (2013.01); *G06F 17/30876* (2013.01)

(58) Field of Classification Search
USPC ........................................................ 707/691
See application file for complete search history.

(56) References Cited

U.S. PATENT DOCUMENTS

| | | | | |
|---|---|---|---|---|
| 9,833,723 | B2* | 12/2017 | Andersson | A63H 30/04 |
| 2003/0093434 | A1* | 5/2003 | Stickler | G06F 8/24 |
| 2006/0242178 | A1* | 10/2006 | Butterfield | G06F 17/30038 |
| 2008/0092168 | A1* | 4/2008 | Logan | G06F 17/30265 |
| | | | | 725/44 |
| 2009/0018996 | A1* | 1/2009 | Hunt | G06Q 30/02 |
| 2009/0217352 | A1* | 8/2009 | Shen | G06F 17/30038 |
| | | | | 726/3 |
| 2010/0050080 | A1* | 2/2010 | Libert | G06F 17/30038 |
| | | | | 715/716 |
| 2010/0057555 | A1* | 3/2010 | Butterfield | G06F 17/30038 |
| | | | | 705/14.41 |
| 2011/0295775 | A1* | 12/2011 | Wang | G06F 17/30038 |
| | | | | 706/12 |
| 2012/0110043 | A1* | 5/2012 | Cavet | G06F 17/30038 |
| | | | | 707/825 |
| 2012/0158667 | A1* | 6/2012 | Raju | G06F 17/30914 |
| | | | | 707/687 |
| 2014/0115471 | A1* | 4/2014 | Demkin | G06F 9/4443 |
| | | | | 715/719 |
| 2014/0258336 | A1* | 9/2014 | Scott | G06F 21/6227 |
| | | | | 707/783 |
| 2015/0264296 | A1* | 9/2015 | Devaux | H04N 5/77 |
| | | | | 386/226 |
| 2015/0317339 | A1* | 11/2015 | Vranyes | G06Q 10/00 |
| | | | | 707/695 |

OTHER PUBLICATIONS

Bolettieri, Paolo, et al., "Automatic Metadata Extraction and Indexing for Reusing e-Learning Multimedia Objects", MS '07, Augsburg, Bavaria, Germany, Sep. 28, 2007, pp. 21-28.*
Jain, Ramesh, et al., "Extractable Mobile Photo Tags", MLBS'11, Beijing, China, Sep. 18, 2011, pp. 3-9.*
Casares, Juan, et al., "Simplifying Video Editing Using Metadata", DIS '02, London, England, Jun. 25-28, 2002, pp. 157-166.*
Martin, Angel, et al., "Dynamic multimedia creation using knowledge content driven database", ISPA 2012, Leganes, Spain, Jul. 10-13, 2013, pp. 778-783.*

* cited by examiner

METADATA EXTRACTION AND MANAGEMENT

BACKGROUND

Media assets, for example, movies or television (TV) programming, are typically rich in features and may require a variety of different categories of metadata to adequately describe their content. However, the conventional generation of metadata descriptive of a particular media asset is inadequate for enabling an effective comparison of content features across a library of such media assets. As a result, the conventional approach to generating and storing metadata descriptive of media assets fail to address large scale searching and cross-referencing of those media assets.

SUMMARY

There are provided metadata extraction and management systems and methods, substantially as shown in and/or described in connection with at least one of the figures, and as set forth more completely in the claims.

DETAILED DESCRIPTION

Figure 1:
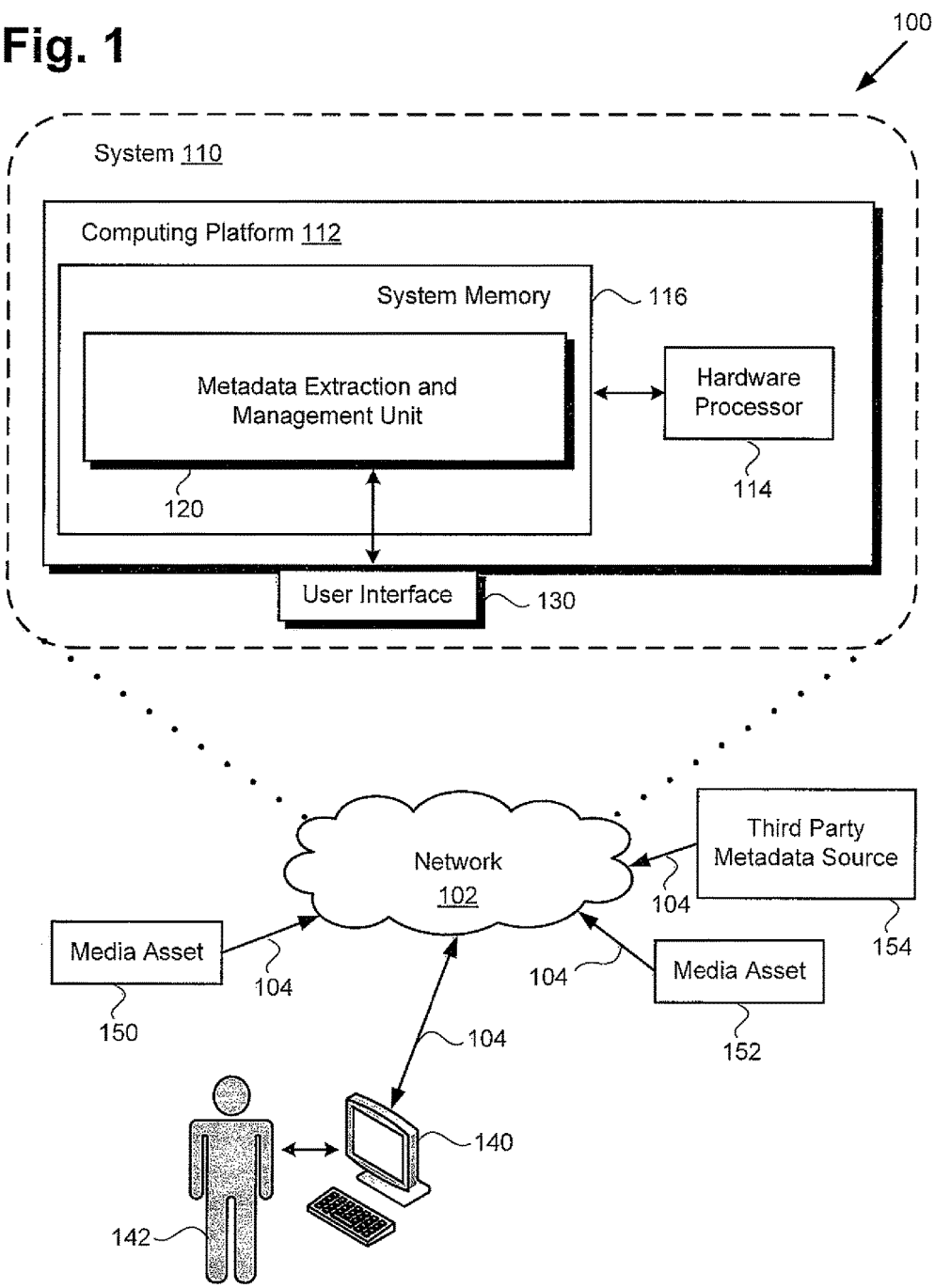
FIG. 1 shows a diagram of one exemplary system for performing metadata extraction and management, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application describes systems and methods for extracting and managing various types of metadata corresponding to a media asset. According to implementations of the present inventive concepts, multiple types of metadata may be extracted from a media asset. Those multiple types of metadata may then be aggregated to produce an aggregated metadata describing the media asset. The aggregated metadata may be transformed into one or more database entries describing the media asset. The one or more database entries may, in turn, be mapped into a graphical database so as to relate the media asset from which the multiple types of metadata were extracted to one or more other media assets represented in the graphical database. Moreover, in some implementations, a portion of the media asset, such as a temporal block of the media asset, may be related to one or more analogous portions of other media assets represented in the graphical database. Consequently, the metadata extraction and management solution disclosed in the present application can increase the efficiency and effectiveness with which large scale searching and cross-referencing of media assets can be performed.

Referring to FIG. 1, FIG. 1 shows a diagram of one exemplary implementation of system 110 for performing metadata extraction and management. As shown in FIG. 1, system 110 having computing platform 112 and user interface 130 is utilized in communication environment 100. Computing platform 112 includes hardware processor 114 and system memory 116. As further shown in FIG. 1, system memory 116 includes metadata extraction and management unit 120 stored therein. Communication environment 100 also includes network 102 interactively linking system 110 with first media asset 150, second media asset 152, third party metadata source 154, and client system 140, via network communication links 104. Also shown in FIG. 1 is system user 142.

It is noted that although FIG. 1 depicts system 110 as including single computing platform 112, more generally, system 110 may include one or more computing platforms, such as computer servers for example, which may be co-located, or may form an interactively linked but distributed system. For example, system 110 may be implemented as a cloud based system. As a result, hardware processor 114 and system memory 116 may correspond to distributed processor and memory resources within system 110. Thus, it is to be understood that the features attributed to metadata extraction and management unit 120 elsewhere in the present application may be stored remotely from one another within the distributed memory resources of system 110.

According to the implementation shown by FIG. 1, system user 142 may utilize client system 140 to interact with system 110 over network 102. In one such implementation, as noted above, system 110 may be a cloud based system including one or more web servers, accessible over the Internet. Alternatively, system 110 may correspond to one or more computer servers supporting a local area network (LAN), or included in another type of limited distribution network. It is noted that although client system 140 is shown as a personal computer (PC) in FIG. 1, that representation is also provided merely as an example. In other implementations, client system 140 may be any other suitable mobile or stationary computing device or system.

Figure 2:
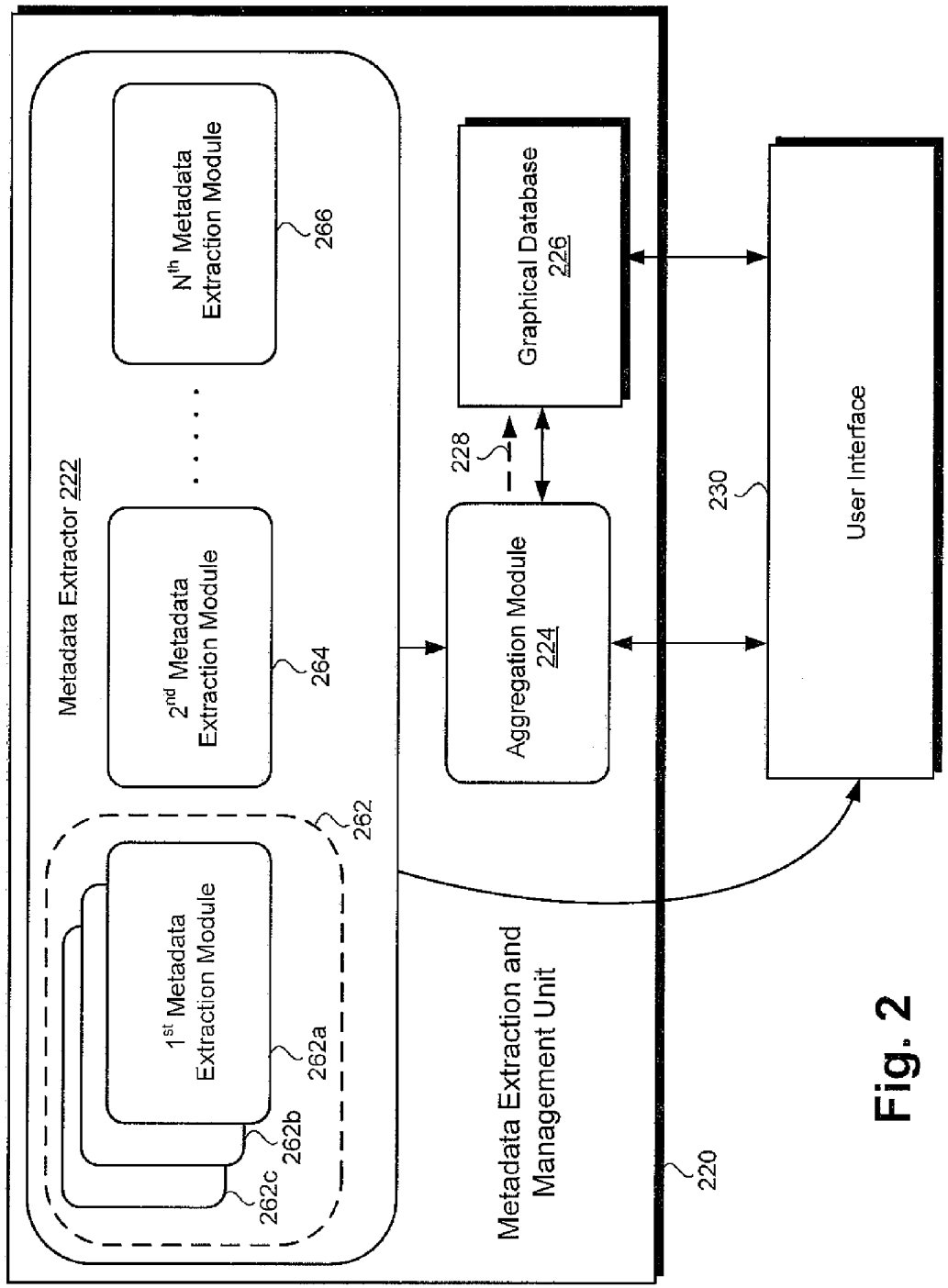
FIG. 2 shows a more detailed representation of a metadata extraction and management unit suitable for use in the system of FIG. 1, according to one exemplary implementation.

Continuing to FIG. 2, FIG. 2 shows a more detailed representation of metadata extraction and management unit 220 suitable for use in system 110 in FIG. 1, according to one exemplary implementation. As shown in FIG. 2, metadata extraction and management unit 220 includes metadata extractor 222 utilizing multiple metadata extraction modules. For example, and as depicted in FIG. 2, metadata extractor 222 may include first metadata extraction module 262, second metadata extraction module 264, and so forth, up to $N^{th}$ metadata extraction module 266, where N may be any integer greater than two. It is noted that first metadata extraction module 262 is shown as being provided as multiple instantiations 262a, 262b, and 262c of metadata extraction module 262. It is further noted that any or all of second metadata extraction module 264 through $N^{th}$ metadata extraction module 266 may be analogously provided as multiple instantiations of the same metadata extraction module.

Metadata extraction and management unit 220 also includes aggregation module 224, and graphical database 226 receiving one or more database entries 228 from aggregation module 224. It is noted that aggregation module 224, graphical database 226, and one or more database entries 228 are described in greater detail below. Also shown in FIG. 2 is user interface 230 interactively linked to metadata extraction and management unit 220. Metadata extraction and management unit 220 and user interface 230 correspond respectively in general to metadata extraction and management unit 120 and user interface 130, in FIG. 1, and may share any of the characteristics attributed to those corresponding features in the present application.

FIGS. 1 and 2 will now be further described by reference to FIG. 3, which presents flowchart 370 describing an exemplary method for use by a system to perform metadata extraction and management, according to one implementation. With respect to the method outlined in FIG. 3, it is noted that certain details and features have been left out of flowchart 370 in order not to obscure the discussion of the inventive features in the present application.

Figure 3:
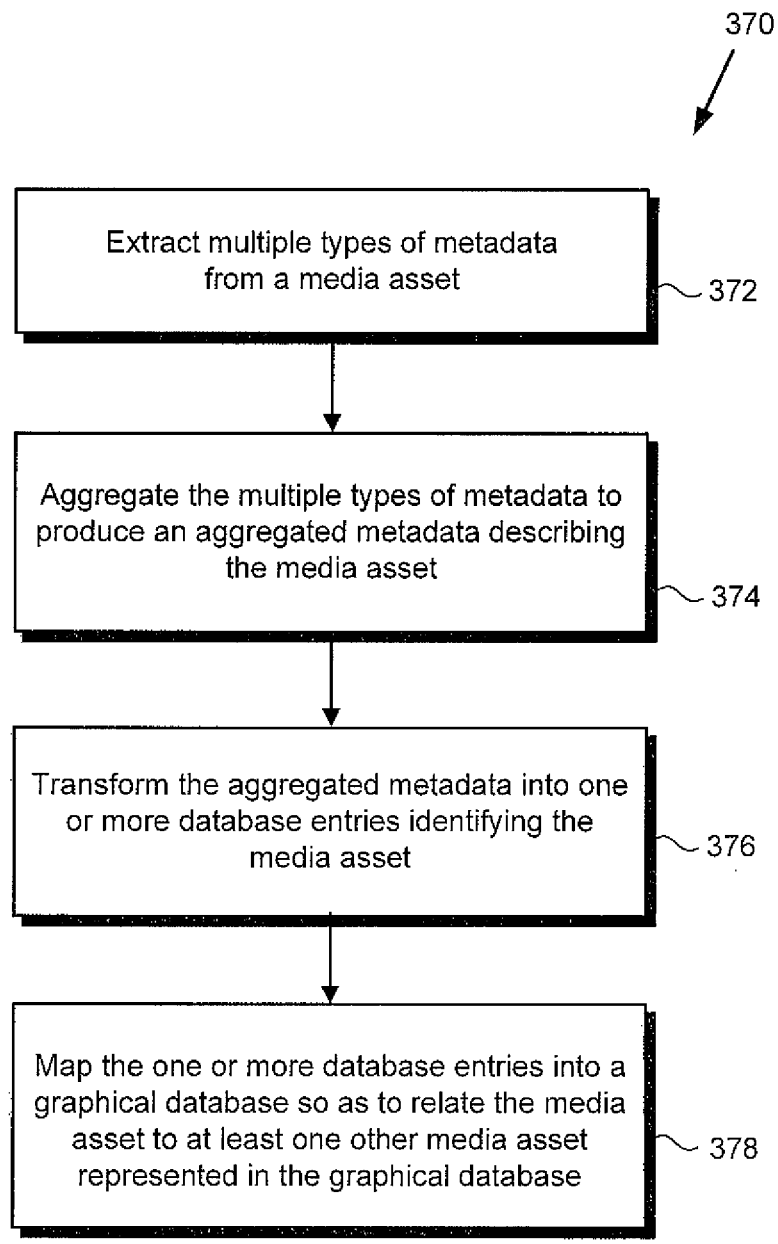
FIG. 3 is a flowchart presenting an exemplary method for use by a system to perform metadata extraction and management, according to one implementation.

Referring to FIG. 3 in combination with FIGS. 1 and 2, flowchart 370 begins with extracting multiple types of metadata (hereinafter "metadata types") from a media asset (action 372). Hardware processor 114 of system 110 may be configured to execute metadata extraction and management unit 120/220 to extract metadata from either of media assets 150 or 152, using metadata extractor 222.

Media assets 150 and 152 may be media content in the form of a feature film or TV programming, for example. Moreover, metadata extractor 222 of metadata extraction and management unit 120/220 may include multiple metadata extraction modules corresponding respectively to the metadata types to be extracted from media asset 150/152. For example, metadata extractor 222 may include first through $N^{th}$ metadata extraction modules 262 through 266 each specifically configured to extract metadata distinct from that extracted by any other metadata extraction module.

As a specific example, where media asset 150/152 is a feature film or TV programming content, first metadata extraction module 262 may be configured to perform shot detection in order to extract metadata describing the boundaries of substantially every shot in media asset 150/152. Second metadata extraction module 264 through $N^{th}$ metadata extraction module 266 may each be configured to extract other, different types of metadata from media asset 150/152. Furthermore, first metadata extraction module 262 through $N^{th}$ metadata extraction module 266 may each be configured to extract metadata from media asset 150/152 automatically, without the intervention or participation of system user 142. In addition to metadata extracted from media asset 150/152 as a result of shot detection, metadata extraction modules 262 through 266 may be configured to extract metadata through scene detection, facial recognition, speech detection, object detection, and music or soundtrack recognition, to name a few exemplary operations.

In some implementations, hardware processor 114 may be configured to execute metadata extraction and management unit 120/220 to extract the multiple metadata types from media asset 150/152 using metadata extraction modules 262 through 266 operating substantially in parallel. However, in some implementations, some or all of the metadata extraction may be performed sequentially, and may be prioritized based on metadata type. For example, in some implementations, it may be advantageous or desirable to utilize $N^{th}$ metadata extraction module 266 to extract an $N^{th}$ metadata type prior to utilizing first metadata extraction module 262 to extract a first metadata type. Furthermore, when sequential extraction of metadata types is preferred, selection of which of metadata extraction modules 262 through 266 is used to extract metadata from media asset 150/152 next, as well as determination of extraction parameters for the selected metadata extraction module, may be based on an earlier extracted metadata of another type.

It is noted that although the present method is described in terms of the extraction and management of metadata corresponding to one media asset 150/152, in some implementations, hardware processor 114 may be configured to execute metadata extraction and management unit 120/220 to extract and manage metadata for multiple media assets substantially concurrently. For example, instantiation 262a of first metadata extraction module 262 may be utilized to extract a first metadata type from media asset 150 while instantiation 262b is utilized to extract the first metadata type from media asset 152 substantially concurrently. Similarly, multiple instantiations of metadata extraction modules 264 through 266 may be utilized substantially concurrently to extract their respective metadata types from media assets 150 and 152.

Flowchart 370 continues with aggregating the multiple metadata types to produce an aggregated metadata describing media asset 150/152 (action 374). Hardware processor 114 may be configured to execute metadata extraction and management unit 120/220 to produce an aggregated metadata describing media asset 150/152, using aggregation module 224. As shown in FIG. 2, aggregation module 224 may receive the metadata types extracted by metadata extractor 222 using metadata extraction modules 262 though 266. In addition, in some implementations, aggregation module 224 may be configured to receive metadata describing media asset 150/152 from a third party source of metadata describing media asset 150/152 but external to metadata extraction and management unit 120/220, such as third party metadata source 154.

In some implementations, aggregating the multiple metadata types may include using metadata included in one metadata type to validate a metadata included in another metadata type. For example, in some implementations, it may be possible to check the accuracy of metadata included in a second metadata type using a metadata included in a fourth metadata type. In those implementations, hardware processor 114 may be configured to execute metadata extraction and management unit 120/220 to utilize aggregation module 224 to validate some or all of the metadata included in the second metadata type using metadata included in the fourth metadata type.

Flowchart 370 continues with transforming the aggregated metadata into one or more database entries 228 identifying media asset 150/152 (action 376). Hardware processor 114 may be configured to execute metadata extraction and management unit 120/220 to transform the aggregated metadata into one or more database entries 228 identifying media asset 150/152, using aggregation module 224. For example, the aggregated metadata describing media asset 150/152 may be transformed into one or more database entries 228 in the form of a graphical representation or representations identifying and describing media asset 150/152.

Flowchart 370 can conclude with mapping one or more database entries 228 into graphical database 226 so as to relate media asset 150/152 to at least one other media asset represented in graphical database 226 (action 378). Hardware processor 114 may be configured to execute metadata extraction and management unit 120/220 to map one or more database entries 228 into graphical database 226, using aggregation module 224. It is noted that relating media asset 150/152 to at least one other media asset represented in graphical database 226 may include relating merely a portion of media asset 150/152, such as a temporal block of media asset 150/152, to one or more analogous portions of other media assets represented in graphical database 226.

In some implementations, metadata extraction and management unit 120/220 may be configured to relate one or more database entries 228 corresponding to media asset 150/152 to at least one other media asset represented in graphical database 226 inferentially. Such inferential identification of a relationship between one or more database entries 228 and at least one other media asset represented in graphical database 226 may be absolute or probabilistic.

For example, in implementations in which metadata extraction and management unit 120/220 performs only absolute inferencing, one or more database entries 228 are related to other media assets only where the relationship can be established with substantial certainty. However, in some implementations, it may be advantageous or desirable to enable probabilistic inferencing by metadata extraction and management unit 120/220. In those latter implementations, metadata extraction and management unit 120/220 may be configured to inferentially relate one or more database entries 228 to another media asset or assets when the certainty of the relationship exceeds a confidence threshold of less than one hundred percent.

It is noted that, in some implementations, the method outlined in flowchart 370 may be fully automated, and may not require the participation of system user 142. In other words, system 110 may extract and manage metadata corresponding to media asset 150/152 automatically, simply as a result of ingestion of media asset 150/152 into system 110.

However, in some implementations, the systems and methods disclosed in the present application may include use of user interface 130/230, by system 110, to display the metadata types extracted as a result of action 372, and/or the aggregated metadata produced as a result of action 374, and/or one or more database entries 228, to system user 142. That is to say, hardware processor 114 may be configured to execute metadata extraction and management unit 120/220 to display the metadata types extracted as a result of action 372, and/or the aggregated metadata produced as a result of action 374, and/or one or more database entries 228, to system user 142, via user interface 130/230.

Figure 4:
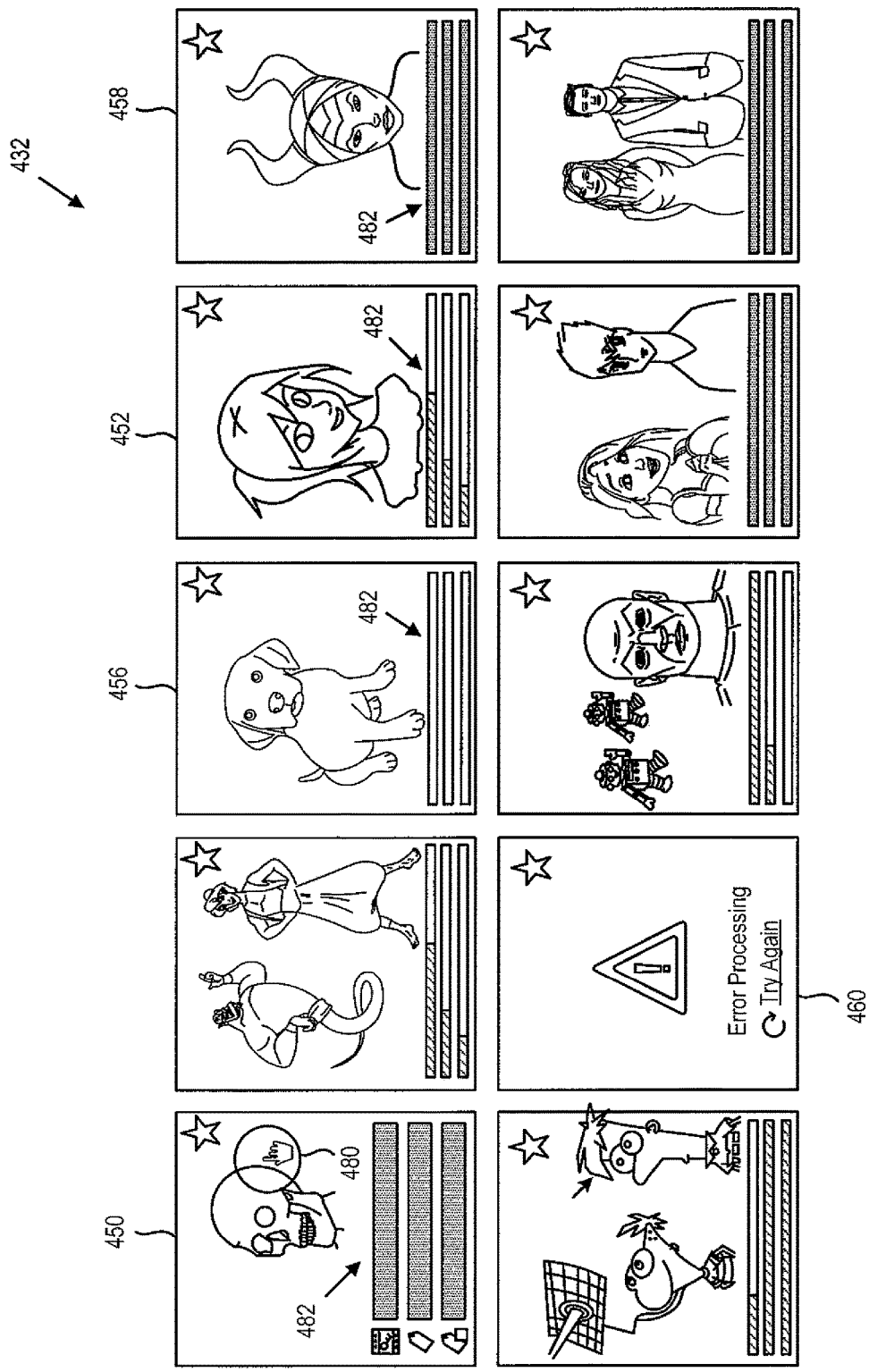
FIG. 4 shows an exemplary display provided by a user interface of the system shown in FIG. 1, according to one implementation.

Referring to FIG. 4, FIG. 4 shows exemplary display 432 provided by user interface 130/230, according to one implementation. Display 432 includes thumbnail representations of several media assets being processed by system 110, including media asset thumbnail representations 450, 452, 456, 458, and 460. Media asset thumbnail representations 450 and 452 correspond respectively in general to media assets 150 and 152, in FIG. 1, and may share any of the characteristics attributed to those corresponding features in the present application. Moreover, media asset thumbnail representations 456, 458, and 460 correspond respectively to media assets analogous to media assets 150 and 152, and which may also share any of the characteristics attributed to analogous media assets 150 and 152 in the present application.

As shown in FIG. 4, according to the present implementation, each thumbnail representation includes the metadata extraction status of its corresponding media asset. For example, media asset thumbnail representations 450, 452, 456, and 458 each include status bars 482 identify the extent to which various metadata types have been extracted from the media assets corresponding respectively to media asset thumbnail representations 450, 452, 456, and 458. Specifically, each of the three status bars shown as status bars 482 may represent a distinct metadata type, while advancement of the colored or highlighted portion of each status bar across its corresponding media asset thumbnail representation indicates how completely each metadata type has been extracted from the media asset.

Thus, status bars 482 of media asset thumbnail representations 450 and 458 indicate that metadata extraction is substantially complete. By contrast, status bars 482 of media asset thumbnail representation 452 indicates that metadata extraction is in progress and at an intermediate stage of completion, while status bars 482 of media asset thumbnail representation 456 indicates that metadata extraction has not yet begun. In addition, media asset thumbnail representation 460 indicates that an error has prevented metadata extraction from occurring. Moreover, selection of media asset thumbnail representation 450 by system user 142, through use of cursor 480 for example, results in enlargement of status bars 482 to identify the specific types of metadata corresponding respectively to status bars 482.

In cases where system user 142 is an authorized knowledge base manager of system 110, hardware processor 114 may be configured to execute metadata extraction and management unit 120/220 to receive a data input from system user 142, via user interface 130/230. Such a system user provided data input may be in the form of a descriptive data further describing a media asset, and/or a corrective data for correcting one or more database entries 228. In addition, in those instances, hardware processor 114 may be further configured to execute metadata extraction and management unit 120/220 to modify one or more database entries 228 based on the data input received from system user 142 via user interface 130/230.

Figure 5:
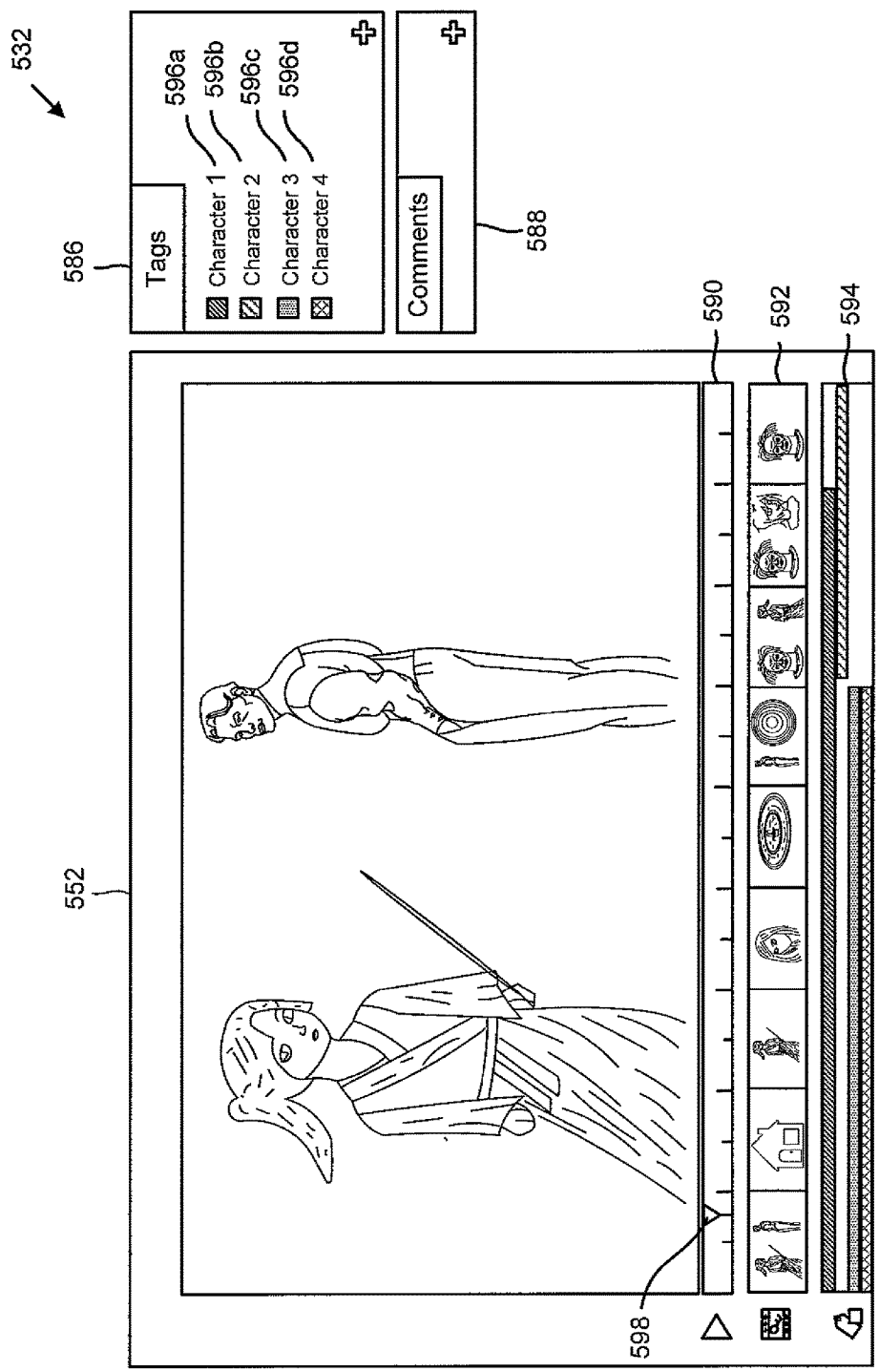
FIG. 5 shows another exemplary display provided by the user interface of the system shown in FIG. 1.

Referring now to FIG. 5, FIG. 5 shows exemplary display 532 provided by user interface 130/230, according to another implementation. Display 532 includes media asset 552, as well as timeline metadata 590, shot and/or scene metadata 592, and theme similarity metadata 594. Also shown as part of display 532 is tags field 586 including tagged media assets 596a, 596b, 596c, and 596d, as well as comments field 588. Media asset 552 corresponds in general to media asset 152/452 in FIGS. 1 and 4, respectively, and may share any of the characteristics attributed to that corresponding feature in the present application.

According to the implementation shown in FIG. 5, display 532 enables system user 142 to view media asset 552 in whole or in part, and to enter descriptive data or corrective data via tags field 586 or comments field 588. For example, theme similarity metadata 594 relates portions of media asset 550 to tagged media assets 596a, 596b, 596c, and 596d. Specifically, at time 598 during playback of media asset 552, media asset 552 has been related by metadata extraction and management unit 120/220 to tagged media assets 596a, 596c, and 596d, but not to tagged media asset 596b. It is noted that tagged media assets 596a, 596b, 596c, and 596d are media assets represented in graphical database 226.

System user 142 may use comments field to correct the media asset entries in tags field 586, or to input descriptive data or corrective data using comments field 588. For example, system user 142 can correct the beginning/end of tags listed in tags field 586 by extending/reducing the colored horizontal bars representative of theme similarity metadata 594. In addition, in some implementations, system user 142 may create new colored horizontal bars for inclusion in theme similarity metadata 594 to manually specify new tags.

It is noted that changes introduced to tags field 586 by system user 142 may be required to conform to a controlled vocabulary for describing media asset 552, in order to facilitate later aggregation and/or search, for example. That is to say, a data input received from system user 142 via user interface 130/230 may conform to a controlled vocabulary for describing media asset 552. However, in some implementations, system user 142 may be free to make entries in comments field 588 free of the constraints imposed by such a controlled vocabulary. It is further noted that timeline metadata 590 advantageously enables system user 142 to correct or otherwise modify metadata included in one or more database entries 228 at timestamp level.

Thus, the present application describes systems and methods for performing metadata extraction and management. According to implementations of the present inventive concepts, multiple metadata types are extracted from a media asset, are aggregated, and are transformed into one or more database entries describing the media asset. The one or more database entries, in turn, are mapped into a graphical database so as to relate the media asset to at least one other media asset represented in the graphical database. Those one or more database entries can then be searched, accessed, and modified. Consequently, the metadata extraction and management solution disclosed in the present application can increase the efficiency and effectiveness with which large scale searching and indexing of media assets is performed.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system comprising:
   a computing platform having a hardware processor and a system memory;
   a metadata extraction and management unit stored in the system memory;
   wherein the hardware processor is configured to execute the metadata extraction and management unit to:
   extract a plurality of metadata types from a media asset;
   aggregate the plurality of metadata types to produce an aggregated metadata describing the media asset;
   use the aggregated metadata to include at least one database entry in a graphical database, wherein the at least one database entry describes the media asset;
   display a user interface for a user to view the media asset, the user interface further displaying a timeline metadata, and a plurality of horizontal bars each corresponding to a different one of tags associated with the media asset and each extending along the timeline metadata to indicate presence of the corresponding tag in the media asset; and
   correcting presence of one of the tags in the media asset, in response to the user extending or reducing the horizontal bar corresponding to the one of the tags via the user interface.

2. The system of claim 1, wherein the hardware processor is further configured to execute the metadata extraction and management unit to determine extraction parameters for extracting metadata included in one of the plurality of metadata types based on an earlier extracted metadata of another metadata type.

3. The system of claim 1, wherein the metadata extraction and management unit comprises a plurality of metadata extraction modules corresponding respectively to the plurality of metadata types.

4. The system of claim 3, wherein the hardware processor is further configured to execute the metadata extraction and management unit to provide multiple instantiations of at least one of the plurality of metadata extraction modules.

5. The system of claim 3, wherein the hardware processor is further configured to execute the metadata extraction and management unit to select a next metadata extraction module for extracting one of the plurality of metadata types based on an earlier extracted metadata of another metadata type.

6. The system of claim 1, wherein the hardware processor is further configured to-execute the metadata extraction and management unit to relate the media asset to at least one other media asset represented in the graphical database.

7. A method for use by a system including a computing platform including a hardware processor and a system memory having stored therein a metadata extraction and management unit, the method comprising:
   extracting, using the hardware processor, a plurality of metadata type from a media asset;
   aggregating, using the hardware processor, the plurality of metadata types to produce an aggregated metadata describing the media asset;
   using the aggregated metadata to include at least one database entry in a graphical database, wherein the at least one database entry describes the media asset;
   displaying a user interface for a user to view the media asset, the user interface further displaying a timeline metadata, and a plurality of horizontal bars each corresponding to a different one of tags associated with the media asset and each extending along the timeline metadata to indicate presence of the corresponding tag in the media asset; and
   correcting presence of one of the tags in the media asset, in response to the user extending or reducing the horizontal bar corresponding to the one of the tags via the user interface.

8. The method of claim 7, further comprising determining, using the hardware processor, extraction parameters for extracting metadata included in one of the plurality of metadata types based on an earlier extracted metadata of another metadata type.

9. The method of claim 7, wherein the metadata extraction and management unit comprises a plurality of metadata extraction modules corresponding respectively to the plurality of metadata types.

10. The method of claim 9, further comprising providing, using the hardware processor, multiple instantiations of at least one of the plurality of metadata extraction modules.

11. The method of claim 9, further comprising selecting, using the hardware processor, a next metadata extraction module for extracting one of the plurality of metadata types based on an earlier extracted metadata of another metadata type.

12. The method of claim 7, further comprising relating the media asset to at least one other media asset represented in the graphical database.

\* \* \* \* \*